United States Patent Office 2,726,983
Patented Dec. 13, 1955

2,726,983

ISONICOTINIC ACID HYDRAZONES AND ANTI-TUBERCULOUS COMPOSITIONS THEREOF

Harry Louis Yale and Jack Bernstein, New Brunswick, N. J., assignors, by mesne assignments, to Olin Mathieson Chemical Corporation, a corporation of Virginia No Drawing. Application January 16, 1952, Serial No. 266,795

15 Claims. (Cl. 167—65)

This invention relates to antituberculous agents and methods for their preparation.

The development of agents for the treatment of tuberculosis has been receiving extensive consideration for some time. Thus far, the most widely used have been streptomycin and dihydro-streptomycin. However, their utility has been limited owing to their toxicity, and patients must be watched carefully, especially where prolonged treatment is required, or where there is an impairment of kidney function. Auditory damage has also been found to result from their use. Furthermore, they suffer from the disadvantage that for optimum results they must be administered by intermittent intramuscular injection rather than perorally.

It is the object of this invention to provide a class of non-toxic antituberculous agents (and methods of preparing them) which are highly efficacious when administered perorally. The antituberculous agents of this invention comprise the following compounds and formulations thereof: isonicotinic acid hydrazones of hydrazone-forming carbohydrates containing not more than 12 carbon atoms.

The hydrazones of this invention may be prepared by adding a solution of the isonicotinic acid hydrazide in absolute ethanol to a solution of a hydrazone-forming carbohydrate in a small quantity of warm water and refluxing the reaction mixture until the hydrazone is formed. Recovery and recrystallization are carried out in accordance with standard procedures.

The preferred carbohydrate reactant is a monosaccharide hexose, which may be an aldose, such as glucose, mannose, and galactose or a ketose such as fructose. Especially preferred is the aldohexose, glucose. The pentoses, such as arabinose and xylose, and the disaccharides, such as sucrose, maltose, and lactose, may also be used.

The compounds may be used perorally as chemotherapeutic agents for tuberculosis, or may be employed as environmental antituberculous agents, especially in hospitals and dairies. Thus, for peroral administration, the compounds may be embodied in various pharmaceutical formulations, which term, as used herein, includes dosage-unit formulations as well as formulations of the compound in a suitable vehicle or carrier (e. g. elixirs, suspensions, distilled-water solutions, saline solutions, etc.). Preferred are the dosage-unit formulations, as capsules and tablets. These may be prepared in the conventional manner. Thus, capsules may be made containing a mixture of the compound and milk sugar in the proportions of 10 and 180 mg. or 25 and 215 mg. respectively. Also, one-piece gelatin capsules may be prepared containing the desired dosage in sufficient corn oil to render the compound capsulatable. Tablets may be prepared to contain 100 mg. or 250 mg. of the compound, using lactose and starch, for example, as excipients, and may be scored to enable one to take fractional dosages if desired.

In sterile aqueous solution, or in physiological saline solution, the compound may be used for intrathecal injection or instilled in 1 or 2 ml. amounts into empyema cavities, large lung cavities, or draining fistulae.

The compounds may also be used as environmental antituberculous agents by dissolving them in a suitable solvent for use as a spray composition, or dissolving them in compatible detergent solutions for use in cleansing.

The compounds of this invention show outstanding activity as antituberculous agents. Thus, in tests on mice, it was found that after administering glucose isonicotinylhydrazone for 35 days (average daily consumption 478 mg./kg.; 0.25% drug in diet), all animals survived. None of the non-treated controls survived; nor did any of the control mice treated with p-amino-salicyclic acid. Tests have further indicated that the glucose isonicotinylhydrazone is far less toxic than the parent compound isonicotinylhydrazide, which is itself a useful antituberculous agent.

Following are specific working examples illustrative of the manner in which the novel hydrazones may be prepared:

EXAMPLE I

*Glucose isonicotinylhydrazone*

To a solution of 36 g. (0.2 mol.) glucose in 20 ml. warm water, there is added 400 ml. absolute ethanol. To this solution is added 27.4 g. (0.2 mol.) isonicotinic acid hydrazide, and the resulting mixture is refluxed for 8 hours. The reaction mixture is then cooled, and the crystals of the hydrazone are collected by filtration, washed with anhydrous ethyl ether, and dried in a desiccator, yielding about 37 g. of crude product melting at 157–159° C. A second crop of crystals, weighing about 11 g., is obtained from the mother liquor. When the crude product is recrystallized from 90% aqueous ethanol, a pure product is obtained, melting at 162–163° C., and having the formula

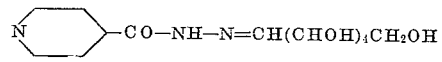

This hydrazone when recrystallized from anhydrous methanol yields a product melting at 163–164° C. and containing 1 mol. methanol of crystallization, thus having the formula

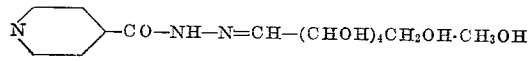

EXAMPLE II

*D(+)galactose isonicotinylhydrazone*

To a solution of 36 g. (0.2 mol.) galactose in 20 ml. warm water, there is added 400 ml. absolute ethanol. To this solution is added 27.4 g. (0.2 mol.) isonicotinic acid hydrazide, and the resulting mixture is refluxed for 8 hours. The reaction mixture is then cooled, and evaporated to dryness under reduced pressure. The gummy residue is triturated with absolute ethanol and the hydrazone crystallizes and is separated by filtration (M. P. 155–157° C.). On recrystallization from 500 ml. 95% ethanol, the pure hydrazone is obtained (M. P. 161–163° C.) having the formula

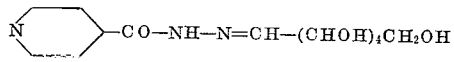

*Analysis.*—Calcd. for $C_{12}H_{17}O_6N_3$: N, 14.04; C, 48.15; H, 5.72. Found: N, 13.96; C, 48.22; H, 5.90.

Using stoichiometric amounts of other hydrazone-forming carbohydrates and substantially the same reaction conditions, other isonicotinic acid hydrazones may be prepared.

The invention may be variously otherwise embodied within the scope of the appended claims.

We claim:

1. An isonicotinic acid hydrazone of a hydrazone-forming carbohydrate containing not more than 12 carbon atoms.
2. An isonicotinic acid hydrazone of a hexose.
3. An isonicotinic acid hydrazone of a pentose.
4. Glucose isonicotinic acid hydrazone.
5. Galactose isonicotinic acid hydrazone.
6. An antituberculous formulation essentially comprising an isonicotinic acid hydrazone of a hydrazone-forming carbohydrate containing not more than 12 carbon atoms and a significant amount of a pharmaceutical carrier.
7. An antituberculous formulation essentially comprising an isonicotinic acid hydrazone of a hexose and a significant amount of a pharmaceutical carrier.
8. An antituberculous formulation essentially comprising an isonicotinic acid hydrazone of a pentose and a significant amount of a pharmaceutical carrier.
9. An antituberculous formulation essentially comprising glucose isonicotinic acid hydrazone and a significant amount of a pharmaceutical carrier.
10. An antituberculous formulation essentially comprising glucose isonicotinic acid hydrazone in dosage-unit form.
11. An antituberculous formulation essentially comprising glucose isonicotinic acid hydrazone in a suitable solvent.
12. An antituberculous formulation essentially comprising glucose isonicotinic acid hydrazone in sterile aqueous solution.
13. An antituberculous formulation essentially comprising glucose isonicotinic acid hydrazone in saline solution.
14. An antituberculous formulation essentially comprising glucose isonicotinic acid hydrazone in tablet form.
15. An antituberculous formulation essentially comprising glucose isonicotinic acid hydrazone in capsule form.

References Cited in the file of this patent

UNITED STATES PATENTS

| | | |
|---|---|---|
| 2,355,911 | Graenacher et al. | Aug. 15, 1944 |
| 2,596,069 | Fox | May 6, 1952 |
| 2,685,580 | Fox | Aug. 3, 1954 |

OTHER REFERENCES

Marini: Anales de la Asociación de Quimica Farmacia del Uruguay, vol. 50, 1948, pp. 3, 12 to 14.

Eiseman: J. Exp. Med., vol. 88, No. 2, August 1948, pp. 189 to 191, 194, 195, 202.

Pigman: Carbohydrate Chemistry, pp. 401 to 403 (1948).

Quarterly Bulletin of Sea View Hospital, vol. 13, No. 1, pp. 17–19, January 1952.

Fox: J. of Organic Chemistry, vol. 17, No. 12, December 1952, pp. 1653–1660.